United States Patent
Remy

[15] 3,681,619
[45] Aug. 1, 1972

[54] OPERATIONAL VIDEO CIRCUIT MODULES

[72] Inventor: Maurice A. Remy, Clamart, France

[73] Assignee: The Office de Radio-Diffusion-Television Francaise, Paris, France

[22] Filed: Feb. 4, 1972

[21] Appl. No.: 112,720

[30] Foreign Application Priority Data

Feb. 6, 1970 France.........................7004303

[52] U.S. Cl. ....................307/237, 307/254, 307/315
[51] Int. Cl. .............................................H03k 17/00
[58] Field of Search......307/237, 315, 254; 330/30 D

[56] References Cited

UNITED STATES PATENTS 3,292,096  12/1966  Deneen, Jr...............307/315 X
3,533,005  10/1970  Alm..........................330/30 D
3,495,182  2/1970  Smith et al..................330/30 D Primary Examiner—Donald D. Forrer
Assistant Examiner—B. P. Davis
Attorney—Abraham A. Saffitz

[57] ABSTRACT

Operational video circuit modules in microelectronic form connectable to other operational video circuit modules performing the same or a different function. The standards concern the admissible peak-to-peak amplitude of the video signals (1 volt), the direct current component amplitude 0.5 volt, the stray direct current output (5 millivolts) for a zero direct current input. Means are provided for cancelling the stray direct current output in each module by means of a temperature-compensated current injector transistor feeding an impedance (resistance or transistor) connecting said injector transistor to the output circuit.

5 Claims, 14 Drawing Figures

3,681,619

INVENTOR:
Maurice A. REMY
By *Abraham A. Saffitz*
ATTORNEY $$G = \frac{45_{6D}}{45_{3D}} = \frac{46_{6I}}{46_{3I}} = 3$$

$$G = \frac{46_{3I} + 46_{6I}}{46_{3I}} = 4$$

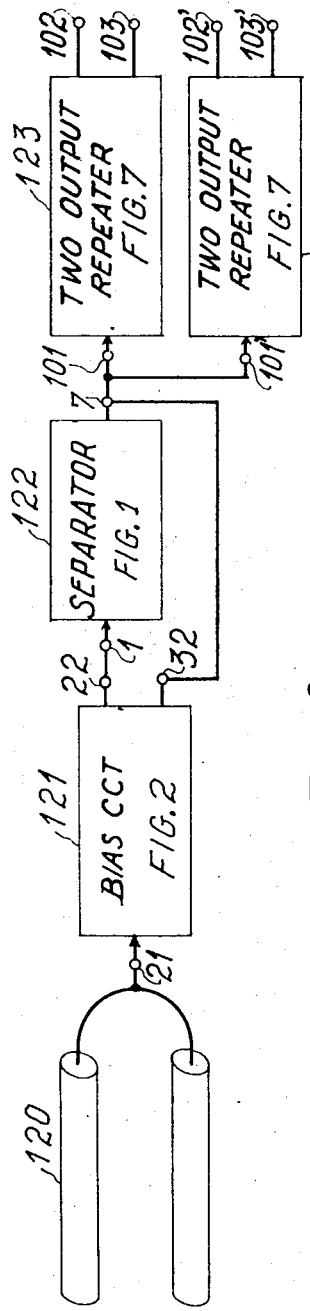
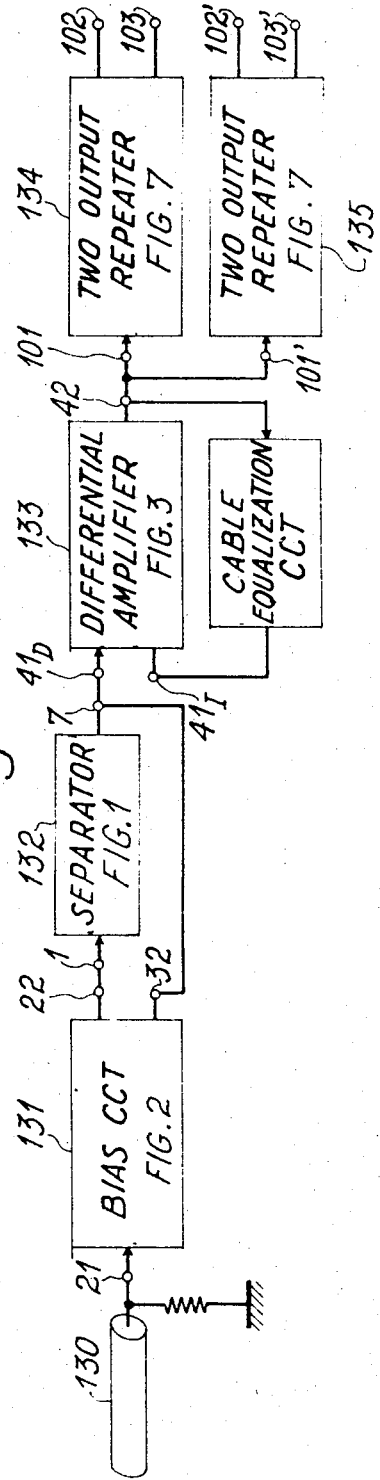

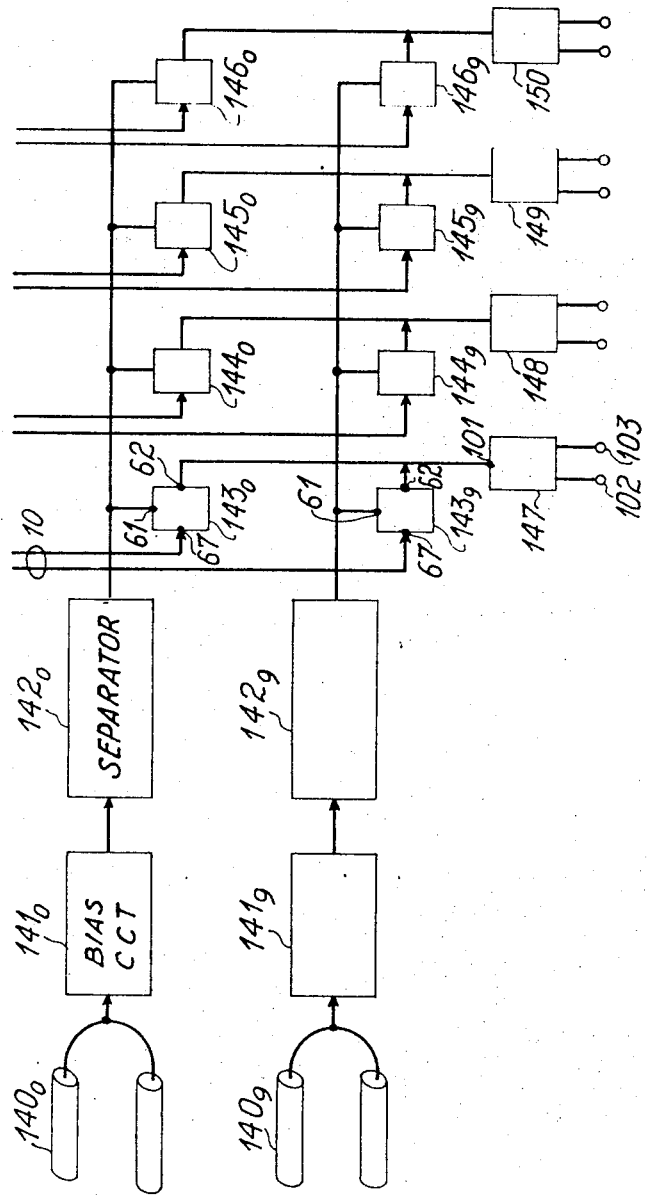

OPERATIONAL VIDEO CIRCUIT MODULES

The present invention relates to functional video circuits or video modules intended to process clamped or non-clamped video signals whereof the nominal maximum peak-to-peak amplitude is standardized and whereof the direct component should remain smaller than a fraction of the said amplitude, for example to half of the same.

The television video signals are characterized by the presence of logical and analogical components; the logical part of the signal carries the synchronizing information and the analogical part determines the luminance of the corresponding point of the image by the difference between its level and a reference or black level.

The integrated logical and analogical circuits known at present do not make it possible to solve the problems inherent in the processing of television signals such as switching, clamping, mixing, peak clipping, during which processing actions one has to take into account the conditions applicable to such signals. In particular, these are:

the need to have an extremely stable gain for the analogical part of the video signal;

the need to transmit the d.c. component of the signal which varies with the image contents;

during switching operation, the need to maintain appropriate decoupling between the different signal sources which are switched, in particular at the color sub-carrier frequencies, as well as to limit the switching interference to a level not visible on the image.

The object of the invention is to produce— in the microelectronics realm — various types of video modules whereof the cascade connection renders it possible to perform these different operations. The advantages of such a series of types are:

miniaturization of the equipment;
greater reliability of the equipment;
a simplification in the design of the items of equipment allowing the easy embodiment of very complex assemblies.

The modules of the invention are interconnectible and consequently comply with interconnection standards The amplitude levels, the input and output impedances of the modules, are such that the modules may be directly interconnected. The series of modules renders it possible to amplify and process clamped or non-clamped video signals whereof the nominal peak-to-peak amplitude is of 1 volt in positive or negative polarity and the superposed direct component is comprised between +0.5 V and −0.5 V.

In most conventional circuits intended for the processing of video signals, the direct component of the video signal, which would imply direct connections between the different stages and would complicate the design of the circuitry, is not transmitted. This direct component is thus separated by capacitors and restored by clamping circuits every time this is necessary, that is to say in practice every time it is intended to have access to the luminance information, whether to reproduce or modify the same.

In the series of functional modules of the invention, the modules are devised in such manner that they can transmit the direct component of the signal without difficulties. This condition prevents the loss and subsequent restoration of the same throughout the length of the "chain" constituted by a plurality of such modules in cascade connection. But, since the video modules comprise transistors and although they transmit the direct current component, precautions must be taken in order that to an input d.c. signal equal to zero corresponds an output d.c. signal also equal to zero. Particularly, in the case of analog amplifier modules the base-emitter voltages for a zero collector current of the transistors and in the case of digital gate modules and inverter modules the emitter-collector voltage at saturation of the transistors must be compensated. It results therefrom that a cascaded chain of the video modules of the invention which transmits the direct current component must be wholly compensated, which means that to a zero signal at the input of the chain corresponds a zero signal at the output of the chain.

According to the invention, the analog amplifier modules comprise amplifier transistors with direct current coupling, a feedback path including a resistor connected between the output and the input of the module and a temperature compensated injector transistor which applies to said resistor a predetermined current for cancelling the base-emitter voltages of the amplifier transistors.

According to another feature of the invention, the digital gate modules and inverter modules comprise gating transistors operating in either of blocking and saturated operation and compensating transistors blocked and saturated simultaneously with the gating transistors and having emitter-collector intervals connected in opposite direction to the emitter-collector intervals of the gating transistors in order to cancel the emitter-collector voltage at saturation of the latter transistors.

The invention will now be described in detail with reference to the accompanying drawings, in which:

FIG. 8 illustrates a video signal distributor;

FIG. 9 illustrates a cable "corrector" or equalizer;

FIG. 10 illustrates a video switching matrix; and

IMPEDANCE MATCHING OR SEPARATOR CIRCUIT (FIG. 1)

This a circuit having a high input impedance and a low output impedance. It may be employed in any case in which there is a need for a high input impedance, for example in an input circuit of loop through, in clamping, etc. Its gain is equal to unity. The direct current input-output difference is smaller than +5 mV at 25° C.

Figure 1:
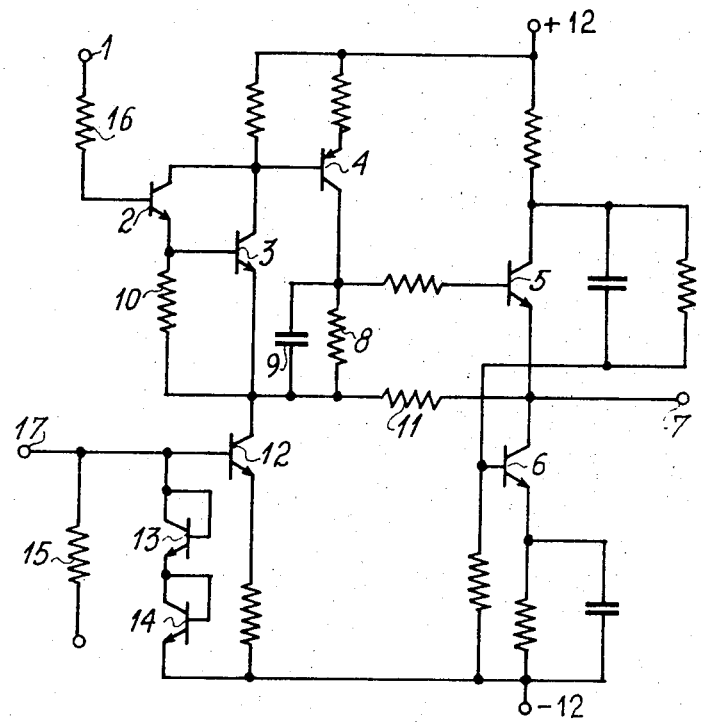
FIG. 1 illustrates an impedance matching circuit according to the invention.
Figure 2:
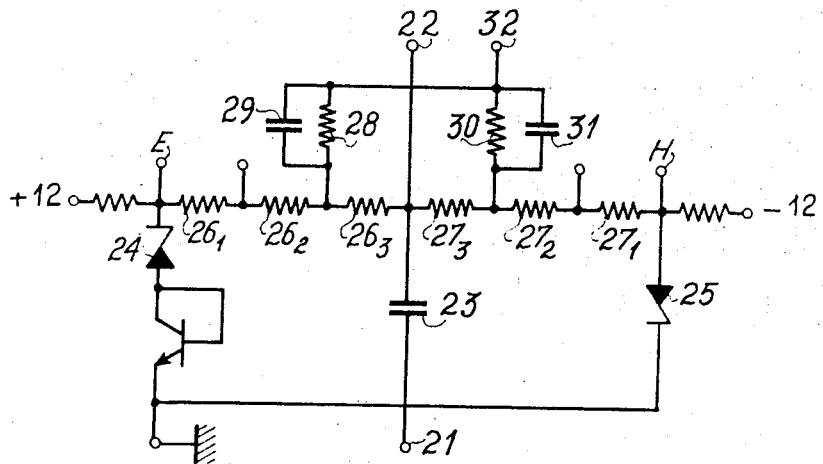
FIG. 2 illustrates a biasing circuit for the impedance matching circuit of FIG. 1.

The input terminal 1 is connected through the resistor 16 to the base of an NPN transistor 2 which forms a Darlington circuit with an identical transistor 3. With the PNP transistor 4, transistors 2 and 3 form a direct connection two-stage amplifier. The collector of the transistor 4 is connected to the base of an "emidyne" transistor 5, and the collector of the transistor 5 is connected to the base of the output transistor 6. The emitter of 5 and the collector of 6 are connected to the output terminal 7. The circuit of FIG. 1 is coupled with a source of input signal by means of the so-called "biasing circuit" of FIG. 2 which will be described later on.

The high frequency feedback is provided by the capacitor 9 in parallel on the resistor 8 and the low frequency feedback is provided by the resistors 11 and 8. This arrangement prevents the variation of the capacitance of the load connected to the output terminal of the separator from modifying the pass-band of the amplifier.

The transistor 12 is a current injector. It behaves as an infinite impedance connected to the feedback loop formed by resistor 11. It feeds with current the transistors 2, 3 and 4.

A fraction of its current passes through the resistor 11 and gives rise to a voltage drop in the same, of approximately 1.2 volt, which balances the biasing voltage $V_{be}$ (between base and emitter) of the transistors of the Darlington circuit 2–3. The adjustment of this current thus renders it possible to obtain a direct signal equal to nought at the output point for a signal equal to nought at the input point.

The transistors 13 and 14 in diode arrangement, control the biasing voltage of the current injector and allow of temperature compensation of the assembly.

The zero adjustment of the direct output voltage is performed by grounding the input terminal 1 and by adjusting the resistor 15 whose lower terminal is momentarily connected to a point of suitable bias potential. The pass band is adjusted by adjustment of the resistor 16.

BIASING CIRCUIT OF THE SEPARATOR (FIG. 2).

This is a circuit normally associated with the separator and intended to cut off the direct component of the signal applied at the input terminal of the separator and to bias this latter so that the mean potential of its output terminal remains at ground potential.

It comprises an input terminal 21 and an output terminal 22 and a capacitor 23 inserted between these two terminals to cut off the direct component. The Zener diodes 24 and 25 provide two voltage sources of approximately ± 8 volts at the points E and H, which are independent of the supply voltage. Between the output terminal 22 and the points E and H, respectively, are connected the resistors $26_1$, $26_2$, $26_3$ and $27_1$, $27_2$, $27_3$, the resistors 26 and 27 having the same index being equal in pairs. This chain forms a voltage divider which establishes the potential of the output terminal 22.

The output terminal 22 is connected to the input terminal 1 of the separator, and the terminal 32 is connected to the output terminal 7 of the separator. The R-C connections 28–29 and 30–31 form feedback paths at very low frequencies; they start off from the terminal 32 and end, respectively, at the points common to the resistors $26_2$ and $26_3$ and $27_2$ and $27_3$. Their function is to increase the apparent resistance of the biasing resistors $26_3$ and $27_3$. These arrangements render it possible to employ a coupling capacitor 23 of relatively low capacitance compatible with the components employed in microelectronics.

DIFFERENTIAL AMPLIFIER (FIG. 3).

This is an operational video amplifier of general use. It comprises feedback networks which render it possible to provide the following functions, by means of a set of connections:

high gain differential amplifier (open feedback loop);

simple fixed gain amplifier, voltage gain G = 1, 10/7, 2, 3, or 4;

fixed gain differential amplifier, G = ± 1, ± 2, or ± 3.

It comprises two identical NPN transistors 43 and 44. The base of 43 is connected by connection D to a plurality of first direct input terminals $41_{1D}$ to $41_{6D}$ through resistors $45_{2D}$ to $45_{6D}$ and through a direct connection for the input terminal $41_{1D}$. The base of 44 is connected by connection I to a plurality of inverse input terminals $41_{1I}$ to $41_{6I}$ through a direction for the input $41_{1I}$ and through a resistor $46_{2I}$ and in parallel with a capacitor for the input terminal $41_{2I}$, and also through a circuit with a resistor and capacitor in parallel $46_{3I}$, $46_{4I}$, $46_{5I}$, and $46_{6I}$ for the input terminals $41_{3I}$, $41_{4I}$, $41_{5I}$, $41_{6I}$.

The NPN transistor 47 is the total current injector for the two amplifier transistors 43 and 44 and the transistor 49 is a current injector for the compensating PNP transistor 51, which plays the part of resistor 11 of FIG. 1. The resistor 48 has half the rating of the resistor 50 and the current supplied by 49 is half of the current supplied by 47. The result thereof is that when the two signals applied to the bases of the transistors 43 and 44 are equal, the collector currents of the NPN transistor 44 and of the PNP transistor 51 are equal and of opposite sign and that no current is fed to the base of the NPN transistor 52.

The NPN transistors 52 and 53 are arranged in a Darlington connection. The NPN transistor 54 serves the purpose of loading the Darlington circuit and the Zener diode 55 balances the biasing voltage $V_{be}$ of the said arrangement (it will be recalled that the voltage $V_{be}$ of a Darlington circuit is equal to the sum of the voltages $V_{be}$ of its two transistors).

The NPN transistor 56 in diode arrangement serves the purpose of temperature compensation of the amplifier. The output point 42 of the differential amplifier is situated between the Zener diode 55 and the transistor 54.

Figure 3:
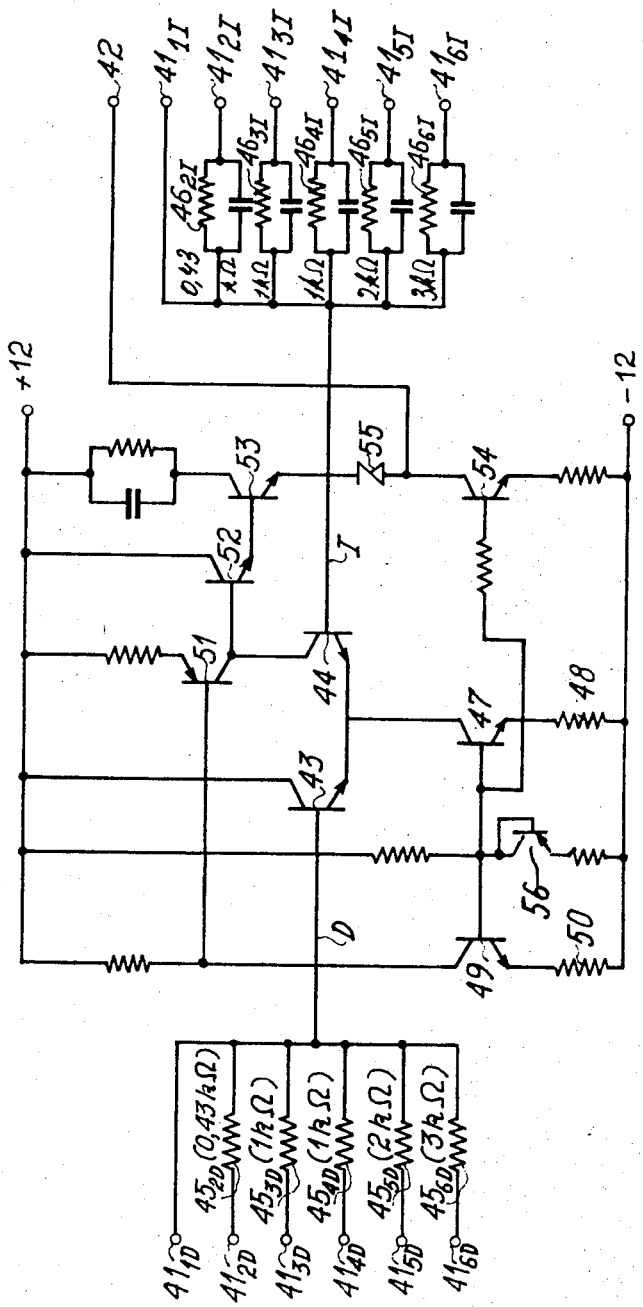
FIG. 3 illustrates a differential amplifier according to the invention.
Figure 4A:
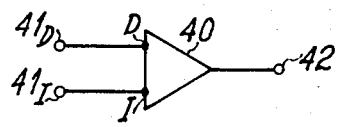
FIGS. 4a, 4b and 4c illustrate several possible layouts for the differential amplifier of FIG. 3.
Figure 4C:
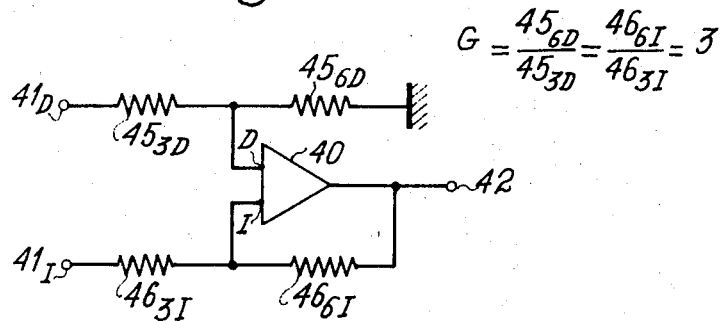
Figure 4B:
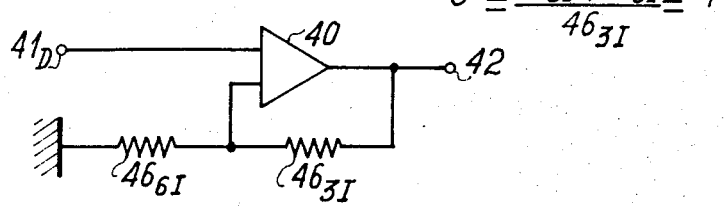

As has been stated, the amplifier of FIG. 3 shown as 40 in FIGS. 4a, 4b, 4c, may be arranged as a high gain differential amplifier according to the diagram of FIG. 4a, as a simple amplifier with a predetermined gain according to the diagram of FIG. 4b, and as a differential amplifier with predetermined gain according to the diagram of FIG. 4c.

VIDEO SWITCHING CIRCUIT (FIG. 5)

Depending on the signal applied to a control terminal 67 (0 volt or +5 volts), the signal appearing at the input terminal 61 appears or does not appear at the output terminal 62.

The switching circuit comprises a first NPN transistor 63 connected in an emidyne arrangement, whose base is connected to the input terminal 61 and whose emitter is connected to the emitter of the NPN transistor 64 functioning in blocked-saturated operation. The output terminal 62 is connected to the negative supply source −12 volts through the external loading resistor 65.

The NPN transistor 66 is the control amplifier driven through its base and 68 is a separating PNP transistor which drives the base of the transistor 64.

When the terminal 67 is connected to +5 volts, 66 is blocked and 68 is saturated, its base being grounded through the resistor 69. The collector of 68 is then at a potential of +5 volts and the base of 64 is biased at approximately 2.4 volts through the voltage divider 70–71. The transistor 64 is then blocked and the switching circuit is blocked.

When the terminal 67 is connected to ground voltage, 66 is saturated and 68 is blocked. The base of 64 is then at a potential of − 12 volts, through resistor 71. The transistor 64 is then saturated and the switching circuit is in the passing condition.

INVERTER CIRCUIT (FIG. 6)

It renders it possible to switch to a single output terminal 83, one or the other of two input terminals 81 and 82 in a time of the order of 10 ns, by means of a driving signal of 0 or 5 volts applied to the driving terminal 87. The direct voltage difference between the passing input terminal and the output terminal is smaller than ± 2.5 mV.

The NPN transistors 84 and 85 are arranged as a differential amplifier, the NPN transistor 89 being the total current injector of this differential amplifier (similar to 47 of FIG. 3). This differential amplifier acts as an amplitude limiter or clipper for the driving signal since the base of the transistor 85 is biased to a predetermined potential. The limiting threshold set by the resistors 90 and 91 is 1.4 volt.

When the transistor 84 is conductive (driving signal of +5 volts at 87), the transistor 85 is blocked. The whole current of the differential amplifier passes through the resistors 92 and 97. The potential of the collector of 84 is sufficiently low to block the NPN transistor 86. Conversely, the base of the NPN transistor 88 is brought to the +12 volts potential and 88 is saturated. The input 82 is connected to the output 83 through the NPN transistors 88 and 94 both saturated.

When the transistor 84 is blocked (driving signal 0 volt at 87), 85 is conductive. The input 81 is connected to the output 83 through 86 and 94 both saturated.

The diodes 95 and 96 render it possible to suppress stray signals due to switching. 94 is a constantly saturated transistor which balances the $V_{ce}$ voltage (collector-emitter voltage) of 86 or of 88 since the emitter-collector voltage of 94 is opposed to the collector-emitter voltage of 86 and 88.

VIDEO REPEATER (FIG. 7)

This is a video power amplifier intended to act in parallel on two co-axial cables having a characteristic impedance of 75 ohms in standardized conditions : 1 volt in 75 ohms with 75 ohms source impedance. The repeater is fed with the video signal in the scheduled conditions of the series of connectible circuits : 1 volt video superimposed on a direct voltage of −0.5 to +0.5 volt, and it transmits the direct component.

The repeater comprises a first voltage amplifier stage comprising the the NPN and PNP transistors 103 and 104 and the NPN transistor 112 this latter acting as a current injector. The output stage comprises the NPN transistors 105, 106, 109, 110, this latter acting as a current injector, 111 is a feedback resistor.

The current injector 112 causes a voltage drop in the resistor 111, which renders it possible, by controlling the injected current, to obtain a zero output when the input signal is equal to zero (111 performs the same function as 11 in FIG. 1).

The transistor 105 is an emitter follower transistor and transistor 106 is a common emitter transistor connected in parallel to the load. This circuit is commonly called a shunt regulated amplifier. The emitter of 105 and the collector of 106 are connected therebetween and to the output terminals 107 and 107'. Transistor 109 is an impedance matching emitter follower transistor since the input impedance of 106 is too low for the base of 106 being directly connected to the collector of 105. Transistor 110 is a current injector which injects a predetermined current into resistor 108 for defining the bias potential of transistor 109.

The two transistors 113 and 114 in diode arrangement, and the resistor 115 serve the purpose, respectively, of temperature compensation and of controlling the current delivered by the transistor 112. They are equivalent, respectively, to the transistors 13 and 14 in diode arrangement and to the resistor 15 of FIG. 1.

Three examples of application of the connectible modules of the invention, selected among the distribution and switching equipments, will now be described.

Figure 7:
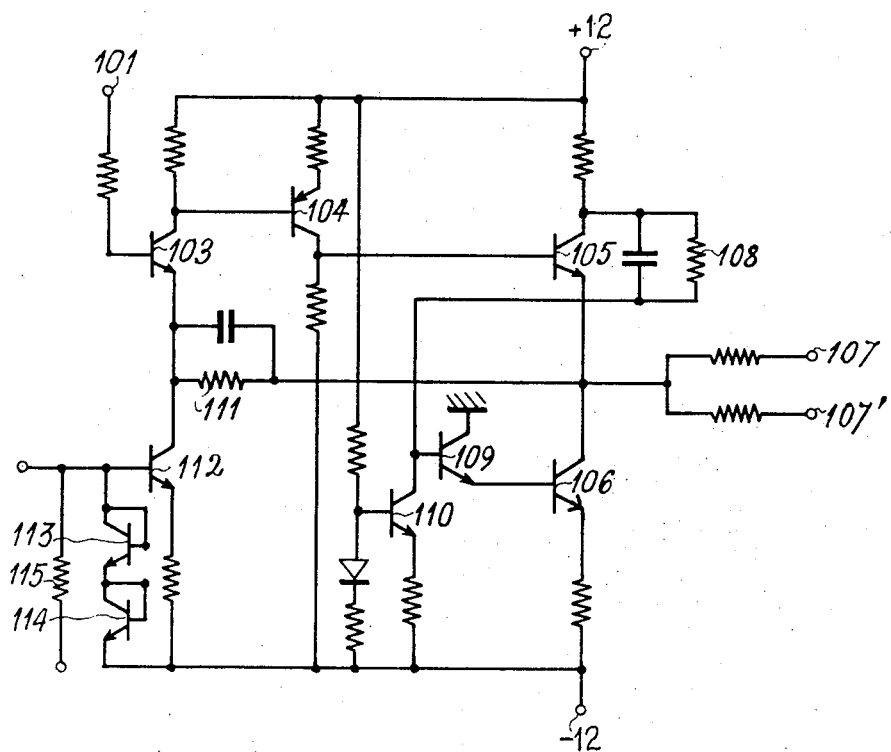
FIG. 7 illustrates a repeater with two outputs.

FIG. 8 illustrates a distributor. It comprises a tap or loop-through connection on the co-axial cable 120, a biasing circuit 121 of the type of FIG. 2, a separating circuit 122 of the type of FIG. 1 and two repeaters 123 and 124 of the type of FIG. 7, each having two outputs, respectively 102 and 103, and 102' and 103'. On each circuit, the input and output terminals have been shown with the same reference numerals as on the figures illustrating the electronic diagram of the said circuit.

FIG. 9 illustrates a cable corrector or equalizer. It comprises a co-axial feed cable 130, a biasing circuit 131 of the type of FIG. 2, a separating circuit 132 of the type of FIG. 1, a differential amplifier 133 of the type of FIG. 3, and two repeaters having two outlets, 134 and 135, of the type of FIG. 7. The cable equalization circuit is formed of resistors and capacitors 46 of FIG. 3.

Figure 5:
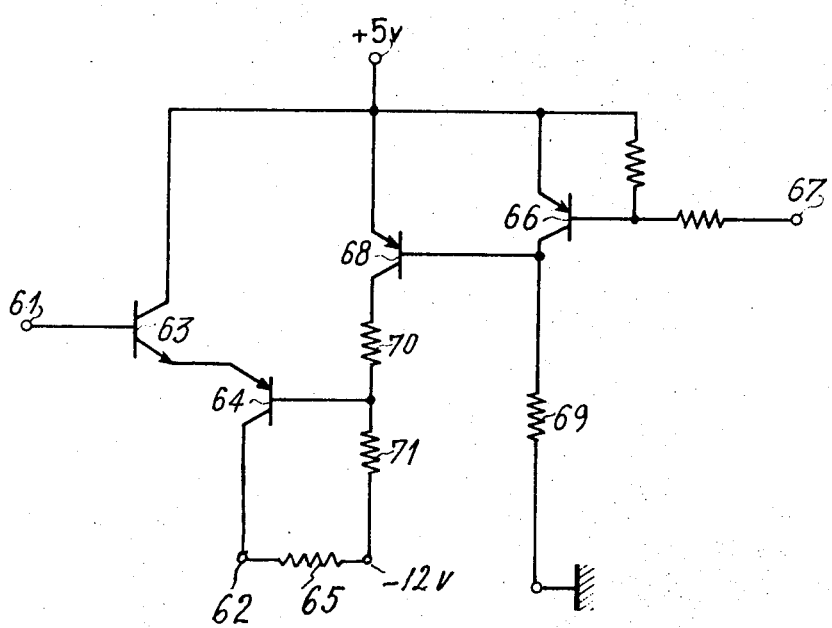
FIG. 5 illustrates a crosspoint equivalent to an open or closed relay.
Figure 6:
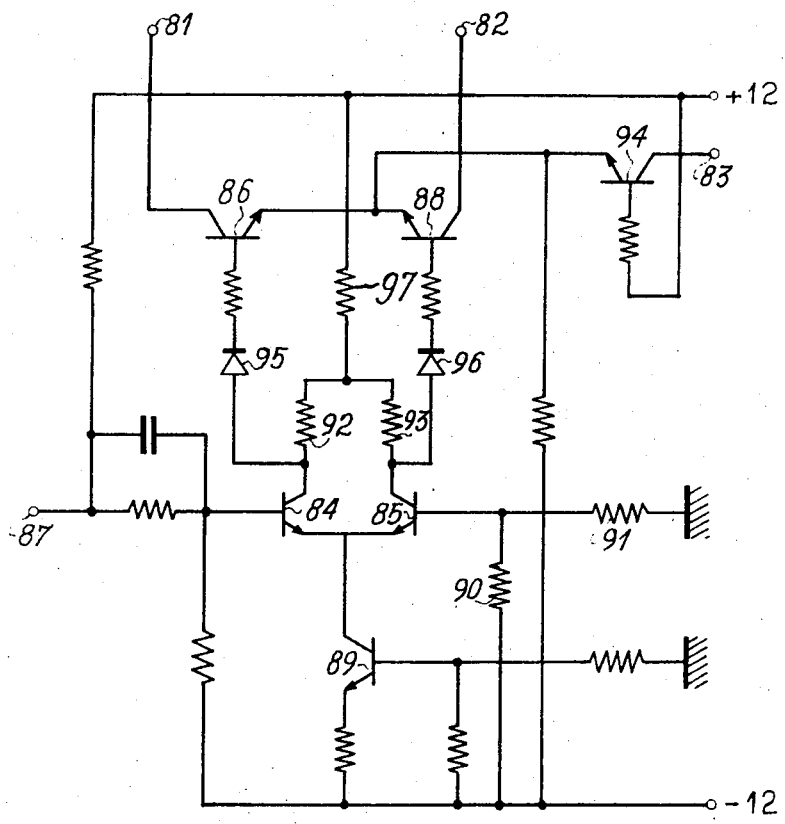
FIG. 6 illustrates a rapid inverter.

FIG. 10 illustrated a switching matrix in which the crosspoints of the type of FIG. 5. It has 10 lines and four columns.

Each line comprises a tap connection on the cable $140_0$ to $140_9$, a biasing circuit $141_0$ to $141_9$, a separating circuit $142_0$ to $142_9$, and four crosspoints $143_0$ to $143_9$, $144_0$ to $144_9$, $145_0$ to $145_9$ and $146_0$ to $146_9$ connected to the line through their input terminals 61. Each column comprises 10 feed wires transmitting the control signals to the driving terminal 67 of the crosspoints and an output wire to which are connected in parallel the output terminals 62 of the crosspoints of one and the same column. Each of these output wires leads to a repeater having two output points, respectively, 147, 148, 149, 150. These repeaters are of the type of FIG. 7.

Figure 12:
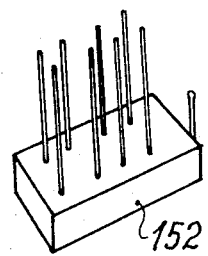
FIGS. 11 and 12 illustrate casings containing the circuits of the invention.
Figure 11:
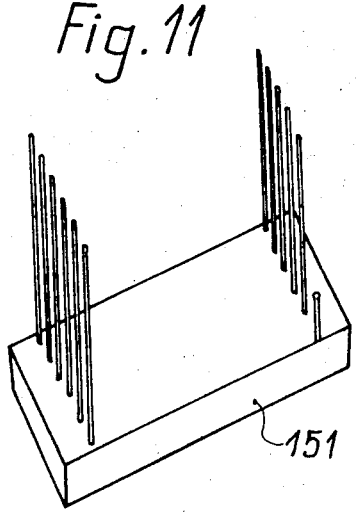

Each circuit is preferably arranged in the form of an integrated circuit, the resistances consisting of tantalum nitride adjustable by anodic oxydation. The circuits are housed in cases 151, 152, of which two examples are illustrated by FIGS. 11 and 12.

What is claimed is:

1. An operational video circuit module in microelectronic form and connectible to other operational video circuit modules intended to process video signals having a maximum peak-to-peak amplitude of about 1 volt and a direct-current component comprised between +0.5 and −0.5 volt, said module having an output direct-current signal lower than 5 millivolts for a zero direct-current input signal, comprising:
an input stage including at least one input transistor connected to an input terminal;
an output stage including at least one output transistor connected to an output terminal;
a feedback impedance connecting said output terminal to said input stage;
a current injector transistor connected between said impedance and a point at a fixed potential of said module, and at least one transistor connected in diode arrangement for biasing and temperature compensating said injector transistor;
and means for adjusting the current injected from said injector transistor so as to cancel the stray output direct-current signal of said module when its direct-current input signal is zero:
said module being characterized in that said output stage comprises two series-connected transistors forming a shunt-regulated amplifier and having said output terminal for their common point.

2. An operational video circuit module as claimed in claim 1, in which said input stage includes two transistors combined into a Darlington circuit.

3. An operational video module as claimed in claim 1, in which said input and output stages both include switching transistors each working in either of blocked and saturated conditions and in which said impedance is that the collector-emitter path of said injector transistor.

4. An operational video circuit module in microelectronic form and connectible to other operational video circuit modules intended to process video signals having a maximum peak-to-peak amplitude of about 1 volt and a direct-current component comprised between +0.5 and −0.5 volt, said module having an output direct-current signal lower than 5 millivolts for a zero direct-current input signal, comprising:
an input stage including two input transistors having their bases respectively connected to two input terminals;
an output stage including at least two output transistors in series connection and connected to an output terminal;
a feedback impedance connecting said input stage to said output stage;
a first current injector transistor series-connected with the emitter-collector paths of both said input transistors, and at least one transistor connected in diode arrangement for biasing and temperature compensating said first current injector transistor together with a second current injector transistor;
said module being characterized in that said impedance is that of the emitter-collector path of a compensating transistor, the base of which is collected to the collector of said second injector transistor.

5. An operational video circuit module as claimed in claim 4, in which said output stage includes a further transistor forming a Darlington circuit with one of said output transistors.

* * * * *